United States Patent [19]
Cushman

[11] 3,908,913
[45] Sept. 30, 1975

[54] SHREDDER ATTACHMENT FOR ROTARY MOWERS

[76] Inventor: Maurice E. Cushman, R.D. No. 4, P.O. Box 348, Fey Rd., Chestertown, Md. 21620

[22] Filed: Aug. 29, 1974

[21] Appl. No.: 501,822

[52] U.S. Cl............. 241/101.7; 56/12.9; 241/186 R
[51] Int. Cl.²......................................... B02C 18/22
[58] Field of Search ......... 56/12.9, 13.1; 241/101.7, 241/186 R, 186.2

[56] References Cited
UNITED STATES PATENTS

| | | | |
|---|---|---|---|
| 2,491,544 | 12/1949 | Arkenberg | 56/12.9 |
| 2,706,372 | 4/1955 | Blydenburgh | 241/101.7 X |
| 3,430,421 | 3/1969 | Matthews | 56/12.9 |
| 3,841,571 | 10/1974 | Dankel et al | 241/186 R X |

Primary Examiner—Roy Lake
Assistant Examiner—E. F. Desmond
Attorney, Agent, or Firm—Raphael Semmes

[57] ABSTRACT

A shredder attachment converts a rotary power mower into a shredder for chopping or shredding leaves, clippings, twigs, small limbs, and other lawn and garden waste. The attachment includes a material receiving apron, an intake duct, and a plate which tightly engages the bottom of the mower housing to form a shredder chamber. An intake opening extends through the plate for admitting material to be shredded from the intake duct to a region of the chamber in which the rotary blade does not advance in the direction of the intake duct opening. A folding leg may be extended to raise the apron and duct so that the shredder attachment may be fed from an elevated position. In first and second embodiments, the intake opening is at the rear side of the mower and the duct extends rearwardly of the mower; in a third embodiment, the intake opening is at the rear side of the mower and the duct extends forwardly of the mower from the intake opening.

22 Claims, 38 Drawing Figures

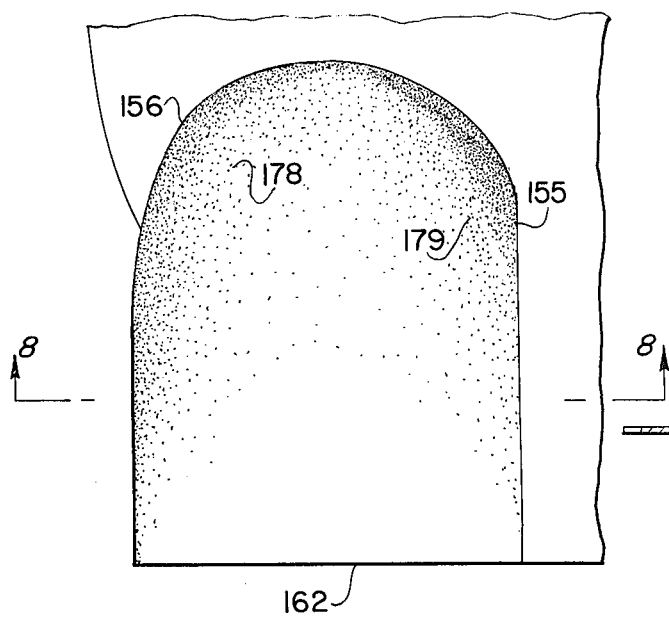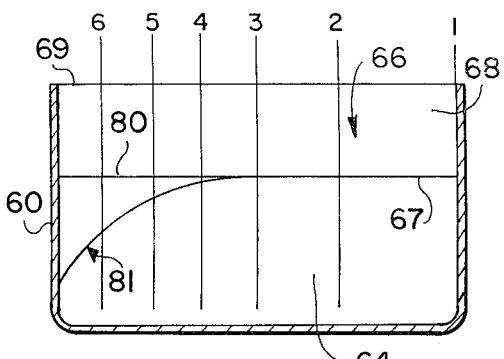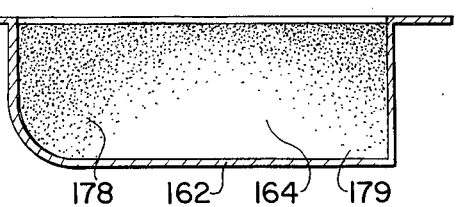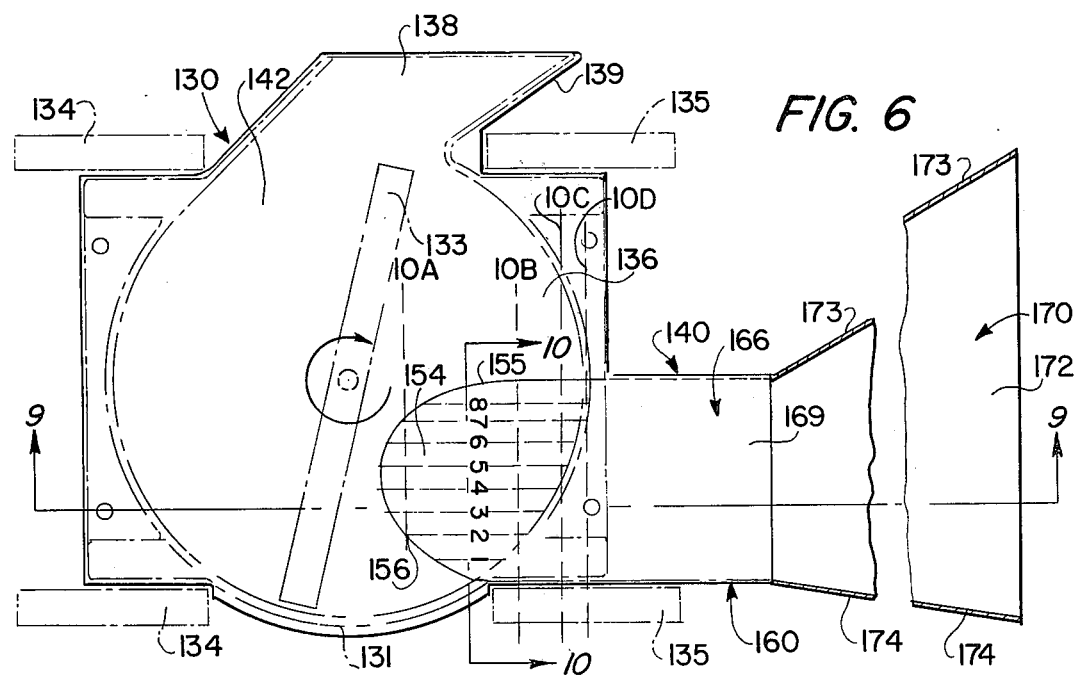

FIG. 12
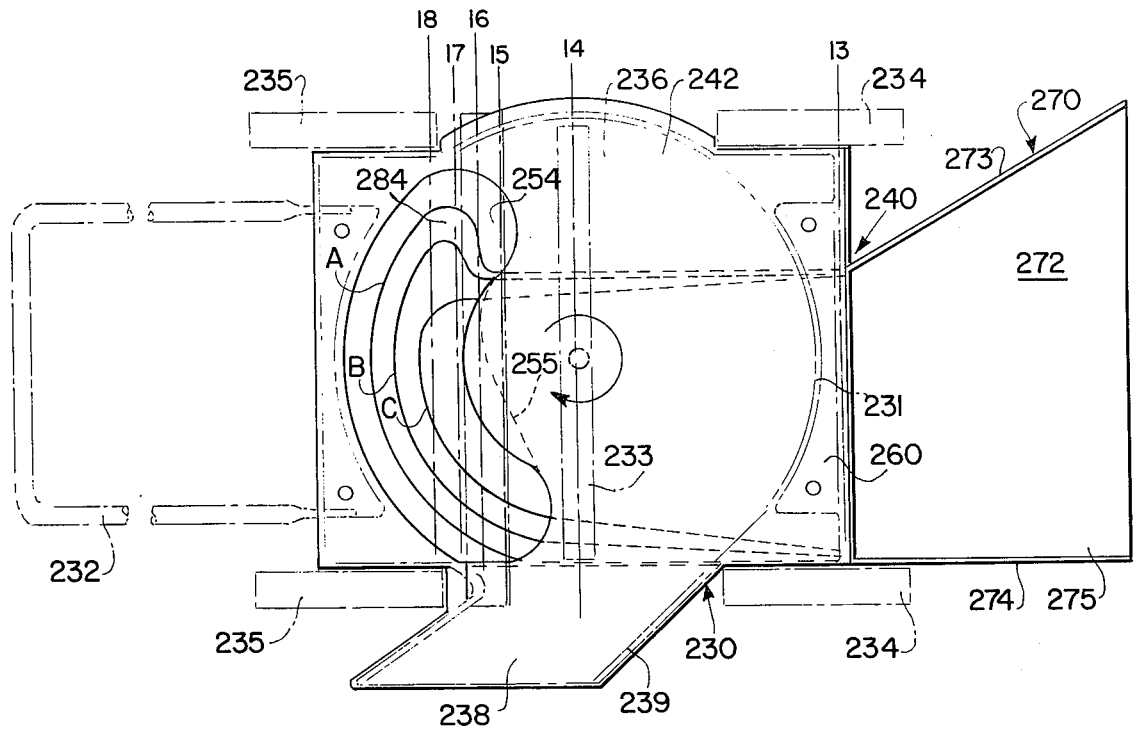
FIG. 15
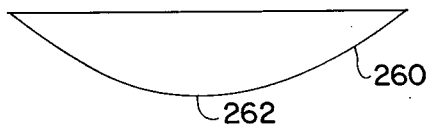
FIG. 18
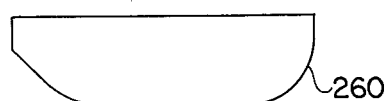
FIG. 14
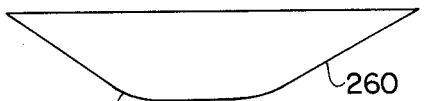
FIG. 17
FIG. 13
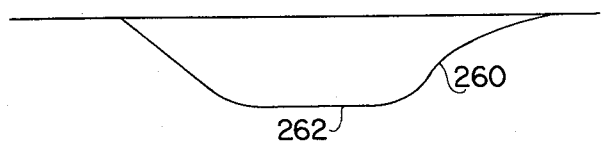
FIG. 16

SHREDDER ATTACHMENT FOR ROTARY MOWERS

BACKGROUND OF THE INVENTION

This invention relates to shredding apparatus and, in particular, to a shredder attachment for converting rotary power mowers into shredding apparatus.

Homeowners and gardeners are often required to dispose of garden and yard debris such as dead leaves, twigs, small branches and the like. While this material may be carted away, bagged for pickup by trach collectors or burned, it has been recognized that decayed vegetation provides an excellent source of fertilizer for application to garden plants, lawns, and the like. For this reason, many gardeners prefer to shred or mulch the accumulated garden debris to reduce its volume and to permit a faster rate of decay of the vegatation in a compost pile. A number of devices have, accordingly, been suggested for mulching dead leaves and other undesired yard debris. For example, power rotary lawn mowers are often provided with mulching attachments. However, with such attachments the rotary power lawn mower can pick up leaves and other yard debris only as it is moved over the ground. On the other hand, special shredding machines have been developed for this purpose; one such prior art shredding machine is shown in U.S. Pat. No. 3,593,930. While such devices are effective, the provision for a separate machine for this purpose is quite expensive. It has also been suggested in Popular Science, October, 1972, Page 178, that a rotary lawn mower can be converted into a shredding machine by building special attachments for this purpose. Because of the danger that the mower blade will throw material out of the intake opening, these attachments do not permit direct access to the mower chamber. For this reason, it is not practical to feed stalks and branches and other non-airborne material into the apparatus. While these prior art attachments enable the lawn mowers to shred leaves, they do not operate in a satisfactory manner.

SUMMARY OF THE INVENTION

It is accordingly the principle object of the present invention to provide an improved shredder attachment for converting rotary power lawn mowers into shredding apparatus.

More specifically, it is an object of the invention to provide an attachment of this character which permits the shredding of a wide range of yard and garden debris including leaves, twigs, branches, and stalks.

It is a further object of the invention to provide a shredder attachment for rotary power lawn mowers which includes means for inhibiting debris from being driven out the entry duct after it is struck by the rotary blade.

It is another object of the invention to provide a shredder sttachment which efficiently feeds material to be shredded into a shredder chamber formed within the power mower by a plate closing the bottom of a rotary lawn mower.

An additional object of the invention is the provision of a shredder attachment which permits the converted lawn mower to be readily moved on two of its wheels to different locations.

To these ends, according to the present invention, a shredder attachment includes a plate for covering the open bottom side of the rotary power mower, the plate having an intake opening. A channel shaped apron, having an open top side for receiving material to be shredded, is connected by means of an intake duct to the plate with the apron, duct and opening aligned so that material may be guided along a path from the apron through the opening into the chamber. The opening is so shaped and positioned that material to be shredded will be admitted to a region of the chamber where the rotary blade does not advance in the direction of the intake duct opening and thus does not drive the material out through the intake duct. In a first and second embodiment of the invention, this region is so located that the rotary blade of the mower will intersect the path only where the blade has components of motion perpendicular to the direction of the path and in the direction of the path. In this way, the blade strikes material being fed into the chamber to drive the material further into the chamber. Because the apron, duct, and opening are aligned, long objects may be inserted direçly into the chamber. The duct includes a curved wall at the downstream side of the opening relative to the direction of motion of the rotary blade, the curved wall extending substantially at an angle of 45° to the plate and serving as reentry ramp means for deflecting air and particles deflected tangentially from the blade back into the chamber. A baffle is provided in the top of the intake duct and is optimally shaped to maintain the cross-section of the duct substantially constant. However, a good approximation obtained when the end of the duct adjacent the apron is rectangular in cross-section is practical. The opening may be in the form of a portion of an annulus, occupying one-fifth of the circumference of the annulus. In a first embodiment, the attachment is adapted for use with a mower having a volute chamber, with the width of the intake opening being substantially equal to the width of the volute, which will typically be one-fifth the diameter of the blade. Since the strongest air flow is concentrated in the outer one-fifth of the blade diameter, with or without a volute wall, this embodiment may also be used with a mower lacking a volute wall and chamber. In a second embodiment, the intake opening has a width substantially greater than one-fifth the blade diameter and is thus adapted for use with mowers which do not include a volute chamber. In both embodiments, the opening is at the rear of the mower with the intake duct and apron extending rearwardly of the mower. In a third embodiment, the opening is at the rear of the mower, with the intake duct and apron extending forwardly of the mower. A folding leg may be provided for propping the mower with the apron in an elevated position. So that the shredder apparatus formed when an attachment of the invention is attached to a mower may be readily moved from place to place, the attachment is secured to the mower in such a way that at least two of the wheels of the mower are available for wheeling the converted mower to a new location.

These and other objects, features, and advantages of the invention will become more readily apparent upon consideration of the accompanying drawings which illustrate preferred embodiments of the invention.

BRIEF DESCRIPTION OF THE DRAWINGS

FIGS. 4A', 4B', 4C', and 4D' are schematic diagrams showing the cross-sectional shape of the intake duct walls and baffle taken along the lines 4A, 4B, 4C, and 4D for the second version of the embodiment of FIG. 2;

FIG. 5 is a section view along line 5—5 of FIG. 3;

FIG. 6 is a plan view of a second embodiment of a shredder attachment of the invention with portions of the rotary mower to which it is attached shown in phantom line;

FIG. 7 is a top view of the second embodiment of a shredder attachment with the plate removed;

FIG. 8 is an end view of the shredder attachment of the second embodiment with the plate removed looking inwardly toward the chamber;

FIGS. 10A', 10B', 10C', and 10D' are schematic diagrams showing the cross-sectional shape of the intake duct walls and baffle taken, respectively, along line 10A, 10B, 10C, and 10D of FIG. 6 for a second version of the second embodiment of FIG. 6;

FIG. 12 is a plan view of a third embodiment of shredder attachment with the rotary power mower to which it is attached shown in phantom line; and FIGs. 13, 14, 15, 16, 17, and 18 are schematic diagrams showing the cross-sectional shape of the intake duct of the embodiment of FIG. 12 taken, respectively, along lines 13, 14, 15, 16, 17, and 18.

DETAILED DESCRIPTION OF THE PREFERRED EMBODIMENTS

Figure 1:
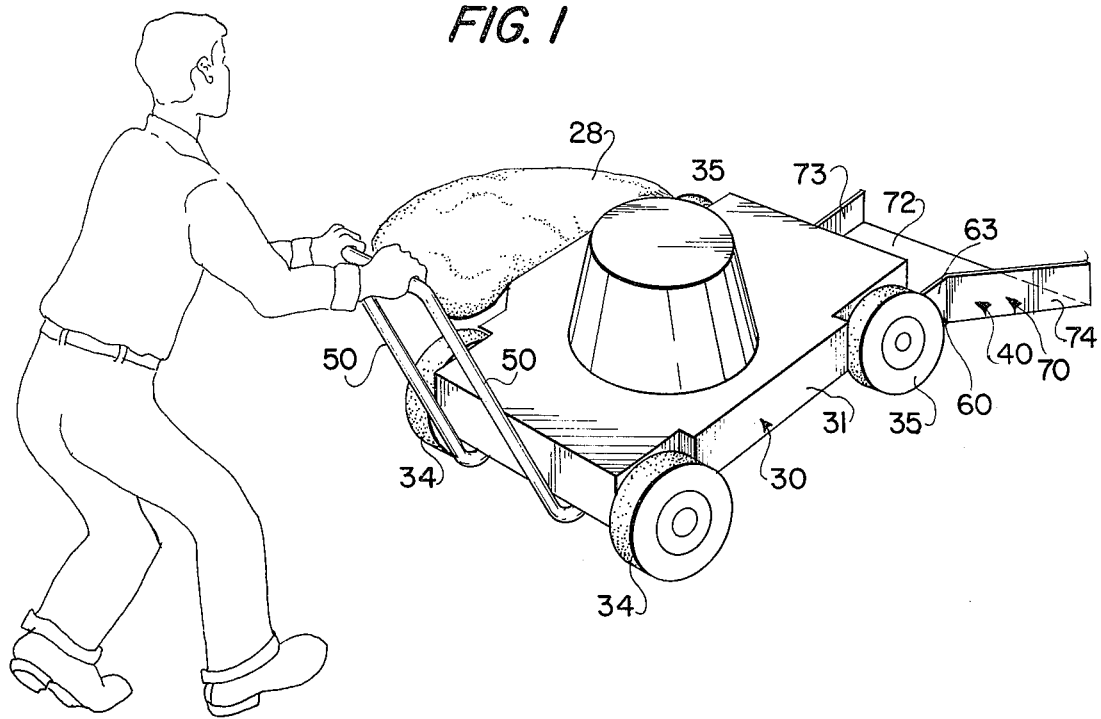
FIG. 1 is a perspective view of a lawn mower equipped with a first embodiment of a shredder attachment of the invention.
Figure 3:
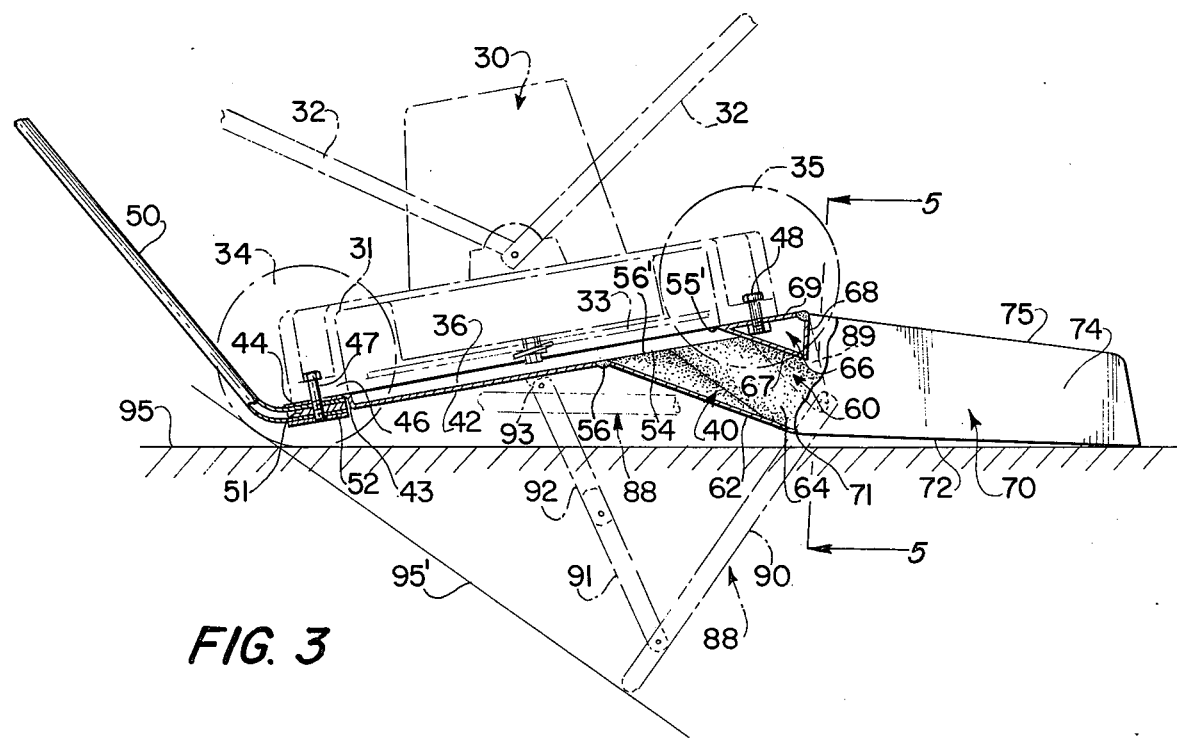
FIG. 3 is a vertical section view of the first embodiment of a shredder attachment taken along line 3—3 of FIG. 2 with the rotary mower to which it is attached shown in phantom line.

Referring to FIG. 1, a power lawn mower 30 is shown being wheeled by an operator with a shredder attachment 40 attached thereto. The lawn mower has a housing 31 and is pushed by means of a special lawn mower handle 50. As shown in FIG. 3, lawn mower 30 may be provided with a conventional reversible handle 32. A handle of this type may be used to push the converted mower by pivoting it to the side of the mower opposite to shredder attachment 40. If, however, the standard handle supplied with the mower is not suitable for pushing the mower with the shredder attachment attached thereto, the standard handle is removed and replaced by special handle 50 which is secured to the mower in a manner to be described in more detail hereinafter. The mower is provided, as is customary, with a pair of front wheels 34 and a pair of rear wheels 35. Since, in the embodiment shown in FIG. 1, attachment 40 extends rearwardly of the mower, the converted mower is wheeled from place to place on the front wheels 34 of the mower.

Figure 2:
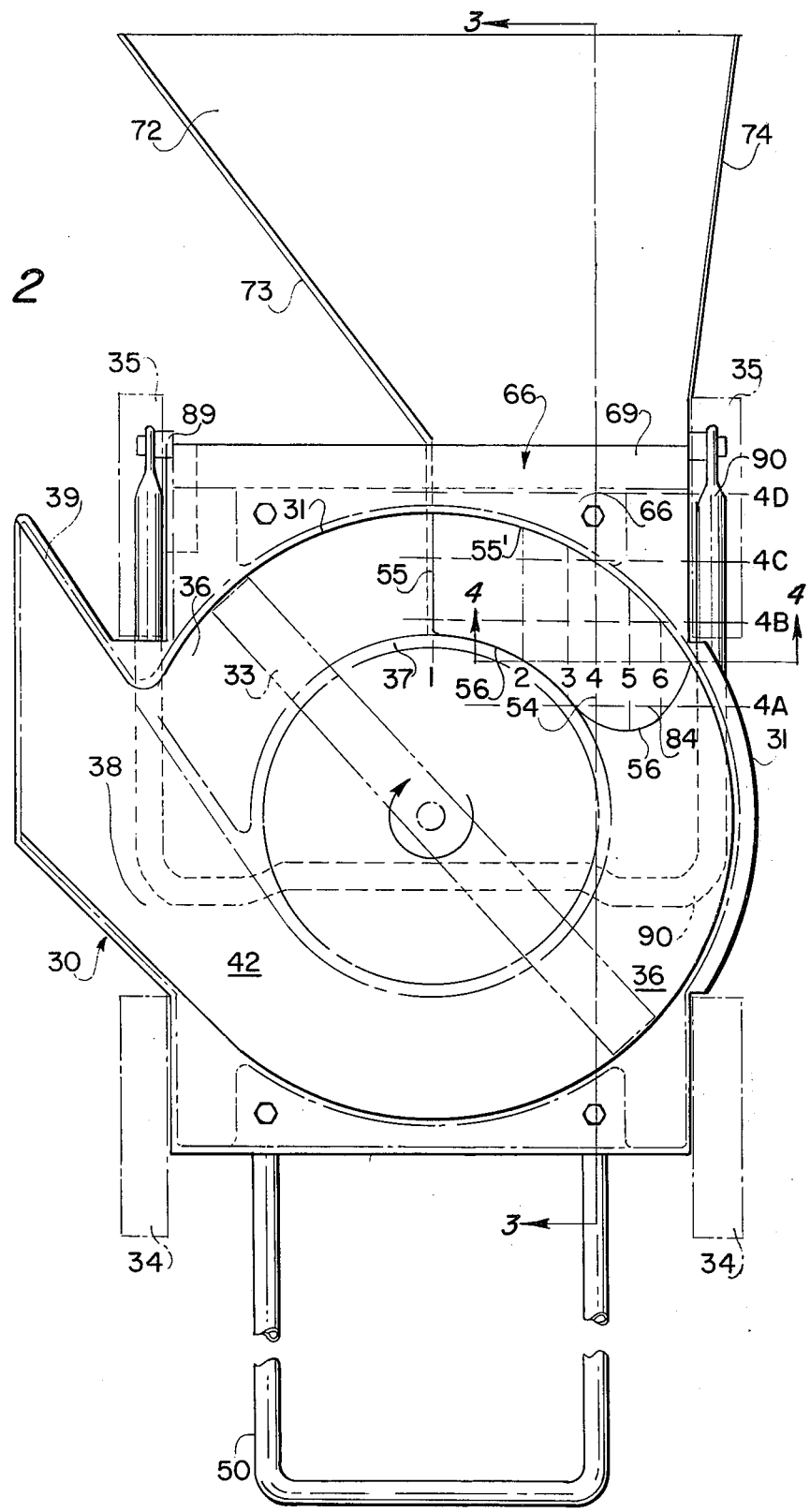
FIG. 2 is a plan view of the shredder attachment of FIG. 1 with portions of the rotary mower to which it is attached shown in phantom line.

As is seen in FIGS. 2 and 3, the mower is provided with a rotary blade 33 which rotates within a housing chamber 36 formed by the lawn mower housing 31. As is customary, a small amount of clearance is provided between the end of the blade and the housing wall. Since the lawn mower shown in FIGS. 1, 2, and 3 is of the volute chamber type, the housing chamber 36 is in the form of an annular volute formed by an annular volute wall 37. A discharge opening 38 is provided for the discharge of material from the mower through a discharge duct 39 to which a bag 28 may be attached for receiving the cuttings from the mower (See FIG. 1).

In general, shredder attachment 40 includes a material receiving apron 70 which receives material to be fed into the shredder apparatus, an intake duct 60 and a plate 42 closing the bottom side of mower 30 to enclose chamber 36. Plate 42 has an intake opening 54 for receiving material along a path from apron 70 through duct 60 into chamber 36. Duct 60 is generally of substantially constant cross-sectional area from opening 54 to its intake end adjacent apron 70 except as noted hereinafter. A baffle 66 forms a top wall 67 of duct 60 and is of such shape as to maintain the desired near constant cross-sectional area of the duct, the slope of which is chosen as a near optimum compromise between maximum cross-sectional area and steepness of slope. It will be noted that baffle 66 is formed by wall 67, a wall 69 in a plane parallel to plate 42, and a wall 68 in the plane of the inlet end of intake duct 60. Ideally, the shape of baffle 66 will result in an opening shaped as defined by line 81 in FIG. 5. Although this shape will provide the desired constant cross-sectional area and is an optimum, it has been found that an approximation as defined by the horizontal line 80 of FIG. 5 is a practical and more desirable alternative as discussed more fully hereinbelow.

As will be seen in FIGS. 2 and 3, plate 42 is shaped to cover the open bottom side of the mower housing 31, tightly engaging the lower edges of the housing sides and forming the bottom wall of housing chamber 36. With plate 42 in place, chamber 36 has two openings: an intake opening formed by opening 54 and a discharge opening through chute 38.

As shown most particularly in FIG. 3, plate 42 is dished to provide suitable clearance under mower blade 33. A shoulder 43 forms a peripheral lip 44 which is secured to the lower edge 46 of the mower housing by means of bolts 47 and 48. Bolts 48 also secure wall 69, which is in the same plane as lip 44, to edge 46. Sufficient clearance should be provided between blade 33 and plate 42 to permit the passage of the thickest limb or other solid object which may be reasonably introduced into chamber 36; three-quarters of an inch clearance seems adequate for most applications. In addition, dishing of plate 42 permits the use of a deeper duct 60 given the same duct slope. If the standard lawn mower handle is not properly positioned for wheeling the lawn mower on its front wheels after the shredder attachment is attached thereto, the handle may be removed and replaced by special handle 50. This is accomplished by securing a foot 51 of handle 50 to the bottom side of lip 44. To this end, a socket for receiving foot 51 is formed by welding a bracket 52 to the bottom of plate lip 44. A metal plug incorporating a transversely drilled threaded hole is installed permanently in foot 51. A bolt 47 is engaged with the threaded hole and serves to attach the handle and clamp plate 42 to the mower housing.

The position of opening 54 is selected primarily for safety and efficiency and is so positioned that any object that is pushed or drawn through duct 60 is forced up into the rotating blade 33 in an area where the blade is traveling either perpendicular to the path of the material entering the chamber or is retreating from the line of travel of the material entering the chamber thus tending to draw the object further into the mower chamber for shredding. If, for example, duct opening 54 were lengthened to extend the full width of the mower or widened substantially toward the center of the mower, it would be possible for an object to be pushed or drawn into the rotating blade at a point where it is advancing in a direction opposite to the direction of feed of material into the chamber with the result that the object may be thrown back out through duct 60. While many shapes of the opening through the plate are possible, as is illustrated for example in other embodiments disclosed in this application, it is desirable that the upstream side 55 (left hand side as shown in FIG. 2) of the opening be on the center line of the mower; this is a prudent location resulting in a substantial reduction in hazard. If upstream side is moved further downstream (to the right as shown in FIG. 2) of the center line, only a slight reduction in hazard is achieved. However, moving left hand edge 55 of the opening to the left side of the center line results in exponential increases in the hazard. It will be noted from FIG. 2 that the width of opening 54 is approximately one-fifth the diameter of blade 33 and is substantially equal to the width of the volute formed by volute wall 37 and outer mower housing wall 31 and that opening 54, which forms a portion of an annulus, extends approximately one-fifth the length of the total annulus.

Figure 4A:
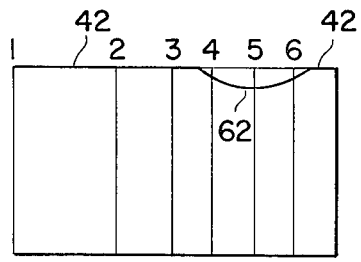
FIGS. 4A, 4B, 4C, and 4D are schematic diagrams showing the cross-sectional shape of the intake duct walls and baffle taken, respectively, along lines 4A, 4B, 4C, and 4D of FIG. 2 for the ideal version of the embodiment of FIG. 1.
Figure 4B:
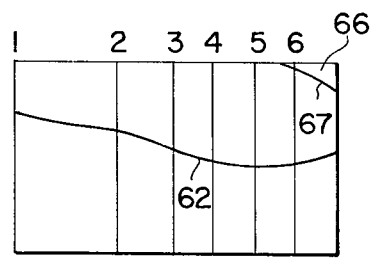
Figure 4C:
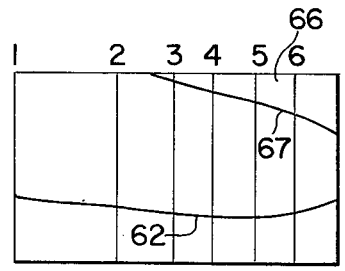
Figure 4D:
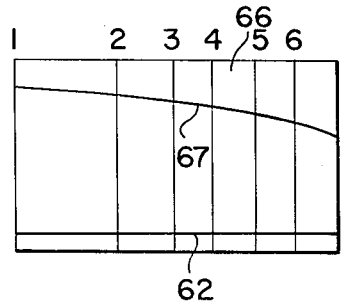
Figure 4:
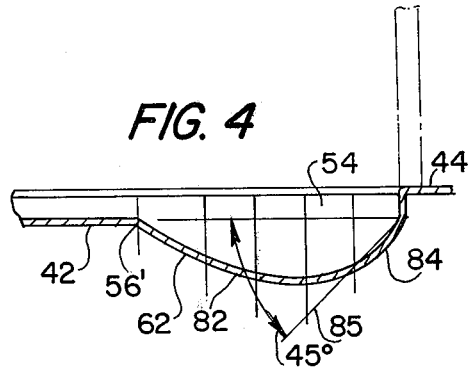
FIG. 4 is a section view along line 4—4 of FIG. 2.

Whatever the basic shape of the duct opening, the downstream edge of the opening (right hand edge 56 as shown in FIG. 2) joins duct wall 62 in a manner determined by the essential requirement that the downstream side of the intake duct 60 intersects plate 42 at an included angle approximating 45° or less. This is illustrated in FIG. 4 where the line 85 defines the 45° angle. With this structure, a reentry ramp 84 is provided for deflecting back into the rotary blade chamber 36 air and particles which, traveling tangentially from the rotating blade, are deflected downwardly while passing across intake opening 54 and therefore impinge upon the side of the duct. Unless the air and particles are deflected back into the blade chamber 36, the air and particles will bounce off the side of the duct in an indiscriminate fashion with some of the particles passing back out of the duct to create a safety hazard, and with the increase in air turbulence resulting in a reduction in duct efficiency. It will be noted that reentry ramp 84 is curved along an arc closely approximating the position of line 85 and smoothly joins the curved bottom portion 82 of duct wall 62. Baffle wall 67 extends at an angle to plate 42 joining plate 42 along edge 55' of opening 54 and being suitably curved to meet the edge 55' along the full width of duct 60 while maintaining a smooth surface. Ideally, the cross-sectional area of duct 60 should be constant in order to minimize clogging which would occur with a converging duct (one that reduces in area from inlet or outlet) and avoid the reduced inlet size resulting from a fixed outlet size and a diverging duct. Turning to FIG. 5, it will be noted that the ideal condition would be provided if duct 60 were bounded by a curved line 81 on the reentry ramp side at the inlet end of the duct. It has been found in practice, however, that the requirement for a reentry ramp as noted above makes it difficult to maintain this constant cross-section throughout the length of the duct; but it has been found that modification of the shape of the inlet end of the duct as viewed from section line 5—5 of FIG. 3 to be rectangular as defined by the horizontal line 80 provides a good approximation. Indeed, this version not only does not produce a tendency to clog, but rather inproves the overall operation of the duct.

Two versions of the embodiment of FIGS. 2 and 3 will now be described. In the first, or ideal, version, an attempt is made to maintain the ideal constant cross-sectional shape of duct 60 throughout its length. In the second, or practical, version, the approximation using the rectangular inlet end is employed.

Figure 3A:
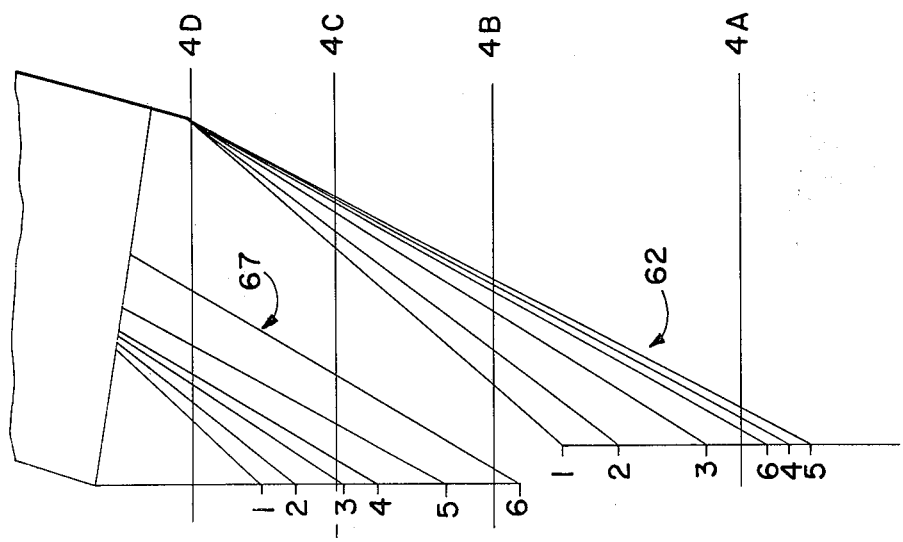
FIG. 3A is a schematic diagram corresponding to the view of FIG. 3 for describing the shape of the intake duct for an ideal version of the embodiment of FIG. 2.

The shape of duct wall 62 and the shape of baffle wall 67 are defined by the schematic diagram of FIG. 3A for the ideal version of the embodiment of FIG. 2. Referring to FIG. 2, it will be noted that a number of section lines 1, 2, 3, 4, 5, and 6 are shown running parallel to the axis of duct 60. Each of these section lines define planes which intersect wall 62 and wall 67 along the lines designated by corresponding reference numerals 1, 2, 3, 4, 5, and 6 in FIG. 3A. FIG. 4A shows the curved shape of wall 62 along section line 4A of FIGS. 2 and 3A; and FIGS. 4B, 4C, and 4D show the changing shape of wall 62 and the shape of baffle wall 67 along section lines 4B, 4C, and 4D, respectively. As mentioned above, this version of the embodiment provides a duct cross-section which is substantially constant.

Figure 3B:
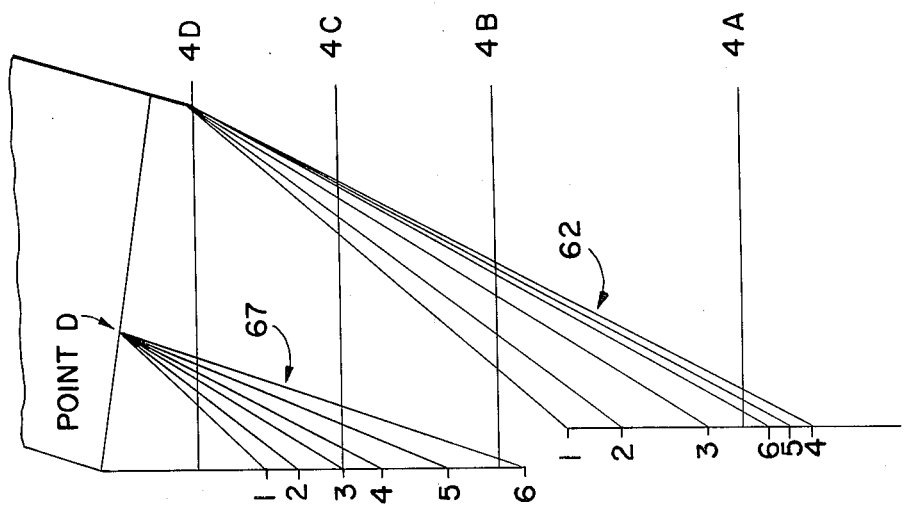
FIG. 3B is a schematic diagram corresponding to the view of FIG. 3 for describing the shape of the intake duct for second version of the embodiment of FIG. 2.
Figure 4A:
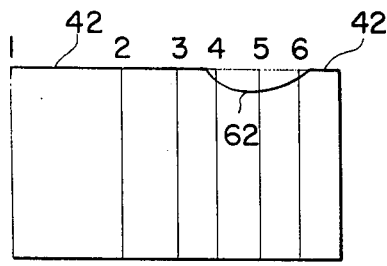
Figure 10A:
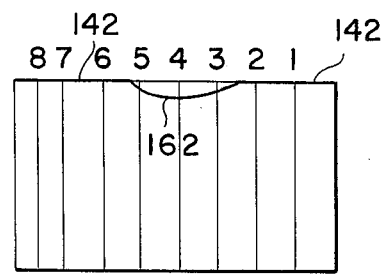
Figure 4B:
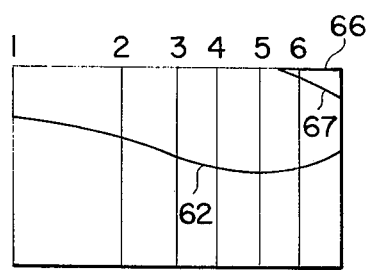
Figure 10B:
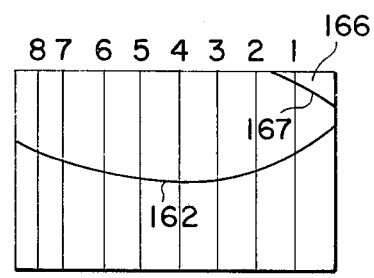
Figure 4C:
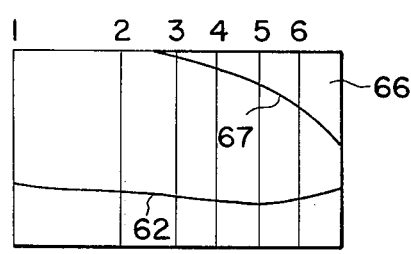
Figure 10C:
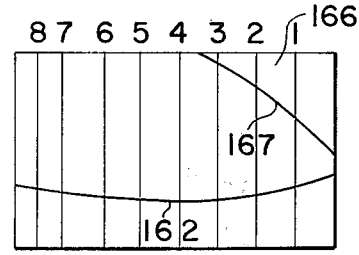
Figure 4D:
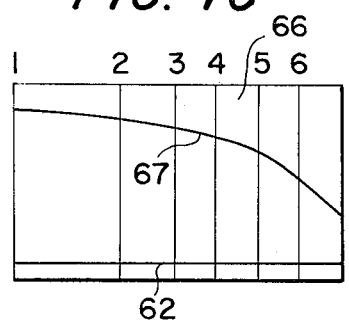
Figure 10D:
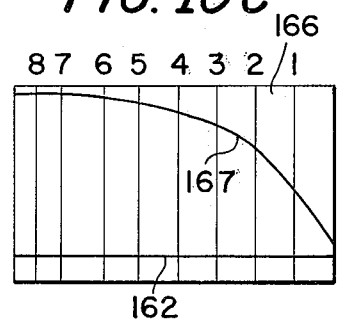

For the second version of the embodiment employing the practical approximation providing a rectangular opening at the inlet end of duct 60 as defined by line 80 in FIG. 5, the shape of duct wall 62 and the shape of baffle wall 67 are defined by the schematic diagram of FIG. 3B. Here, again, lines 1, 2, 3, 4, 5, and 6 define the lines of intersection between section planes 1, 2, 3, 4, 5, and 6 of FIG. 2 and walls 62 and 67. It is to be noted that the lines defining the intersections on baffle wall 67 converge at the inlet end of duct 60, meeting at "Point D". FIG. 4A' shows the shape of wall 62 for the second version along section line 4A. FIGS. 4B', 4C', and 4D' show, respectively, the shapes of walls 62 and 67 along section lines 4B, 4C, and 4D for the second version.

Although the lines of intersection shown in FIGS. 3A and 3B are straight, it is to be understood that these lines could be curved for modified shapes of the duct within the principles of the invention.

As will be readily apparent from FIGS. 2 and 3, intake duct 60 is located under the rear of the mower approximately diagonally opposite the front exhaust quadrant leading to exhaust duct 39. If opening 54 were located too close to the mower exhaust duct, ingested material would be thrown out the exhaust duct before it was thoroughly shredded. The duct extends rearwardly of the mower so that material receiving apron 70, which is channel shaped with a bottom wall 72, side walls 73 and 74, and an open top side 75, may, as shown in FIG. 3, have its bottom wall 72 rest on the ground to provide a material receiving area defined by bottom wall 72 and side walls 73 and 74. This will make it realatively easy for the material to be shredded, such as leaves, to be raked from the ground onto apron 70 and for the material to be pushed into duct 60. In this way, the material is fed along a path from apron 70 through duct 60 and through opening 54 into chamber 36. Material receiving apron 70 is an extension of duct 60. As shown in FIG. 3, bottom wall 72 is joined to the bottom wall 62 of duct 60 with a curved transition therebetween at 71. Material receiving apron 70 is generally aligned with duct 60 so that elongated objects, such as weed stalks and long branches, may be fed directly from apron 70 through duct 60 into chamber 36. Since the location and shape of opening 54 has been selected, as described above, so that the mower blade will tend to drive material into chamber 36, the hazard of direct access to the chamber 36, as just described, is greatly reduced. As will be noted from FIGS. 1 and 2, the left hand wall 73 of material receiving apron 70 diverges outwardly. This arrangement is desirable for two reasons: first, it provides a ground base for the shredder which is disposed symmetrically about the center of gravity of the combined mower-shredder, and second, it restricts the possibility that the insertion of long objects into the upstream side of the duct outlet will be in a near tangential direction and encourages their insertion into the downstream corner of the duct outlet 54.

It will be understood that the shredder attachment, may be formed of three metal parts, namely, plate 42, duct wall 62 and material receiving apron 70, and baffle 66. These parts are then welded together to form the structure of attachment 40. However, other methods of producing a suitably similar structure are possible, as is well known in the art.

After shredder attachment 40 is secured to a mower 30 as shown in FIGS. 1, 2, and 3, it may be used for shredding various types of garden and lawn debris. In one mode of use, the free end of apron 70 rests on the ground 95 as shown in FIG. 3. This makes it relatively easy to rake material to be shredded onto apron 70 from which it may be pushed through duct 60 and opening 54 into chamber 36. The shredded material is ejected through the mower discharge chute 39 and may be allowed to collect into a pile for composting or may be collected in a bag 28, similar to the conventional grass catcher bag normally used with the mower, secured to chute 39. Disposable bags may be used to facilitate the disposal of the compacted waste material without burning. It will be readily appreciated that while some material may be raked directly from the ground onto apron 70, other material such as small limbs can be safely introduced into chamber 36 by hand.

For some applications, it is desirable to feed the shredder apparatus from an elevated position. This is made possible by providing a folding leg assembly 88 including a first U-shaped leg member 90, the ends of the arms of which are pivoted, respectively, to a bracket 89 secured to plate 42 and to a side wall of duct 60. A pair of arms 91 and 92 are pivoted to each other at adjoining ends and, respectively, to the lower end of leg member 90 and a lug 93 depending from the bottom of plate 42. Arms 91 and 92 may be folded into a parallel position which will permit the shredder apparatus to engage ground 95 as shown in full line in FIG. 3. However, if it is desired to load the shredder apparatus from an elevated position, legs 91 and 92 are pivoted to the aligned position shown in phantom line in FIG. 3 so that the end of leg 90 engages ground level 95'. This results in the end of apron 70 being in an elevated position relative to ground level 95' so that it may be readily loaded in this position. This will facilitate the feeding of small limbs, stalks and other items not readily raked onto the apron. It will be readily appreciated that other arrangements of legs for propping the shredder apparatus in the elevated position may be adopted without altering the scope of the invention.

As will be noted most particularly from FIGS. 1 and 3, the attachment of shredder attachment 40 to the mower 30 lifts the rear wheels 35 to an elevated position. This, however, leaves front wheels 34 engaged with the ground. These wheels may be used for moving the shredder apparatus from one location to another. This is accomplished, as shown in FIG. 1, by pushing downwardly on handle 50 to slightly tilt the rear end of the apparatus upwardly and clear of the ground.

Although this embodiment has been described as used with a mower having an annular volute wall 37, it is to be understood that attachment 40 may also be used with a mower which is not provided with a volute wall. In fact, attachment 40 is perferred for use with both types of mowers, because it is the most efficient of the disclosed embodiments. The high efficiency results, in part, from the concentration of the strongest airflow in the outer one-fifth of the blade diameter with or without an inner volute wall.

Figure 9A:
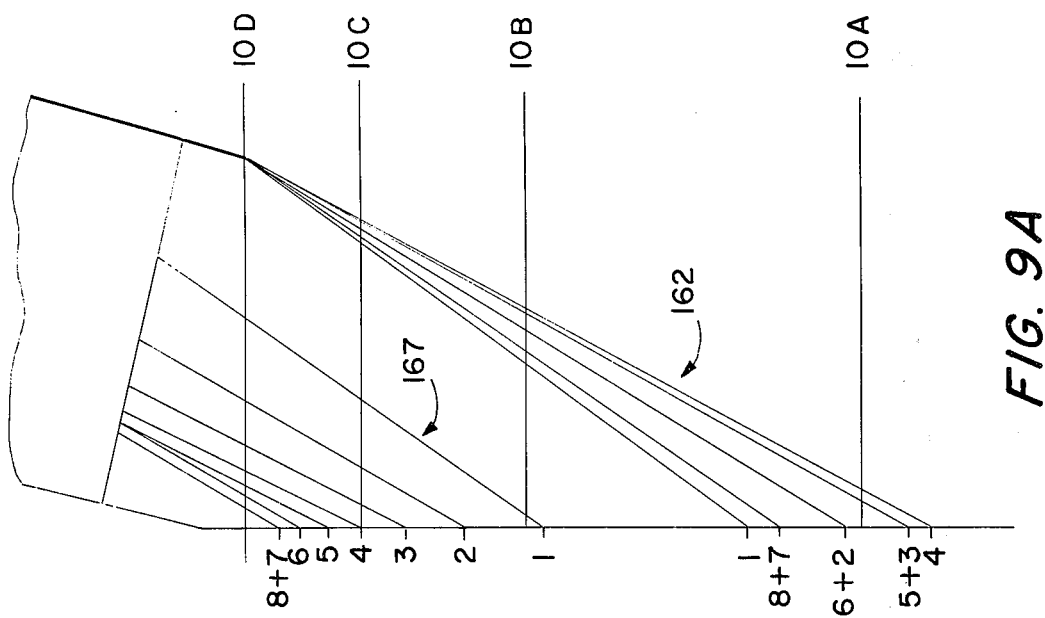
FIG. 9A is a schematic diagram corresponding to the view of FIG. 9 for describing the shape of the intake duct for the ideal version of the embodiment of FIG. 9.
Figure 9B:
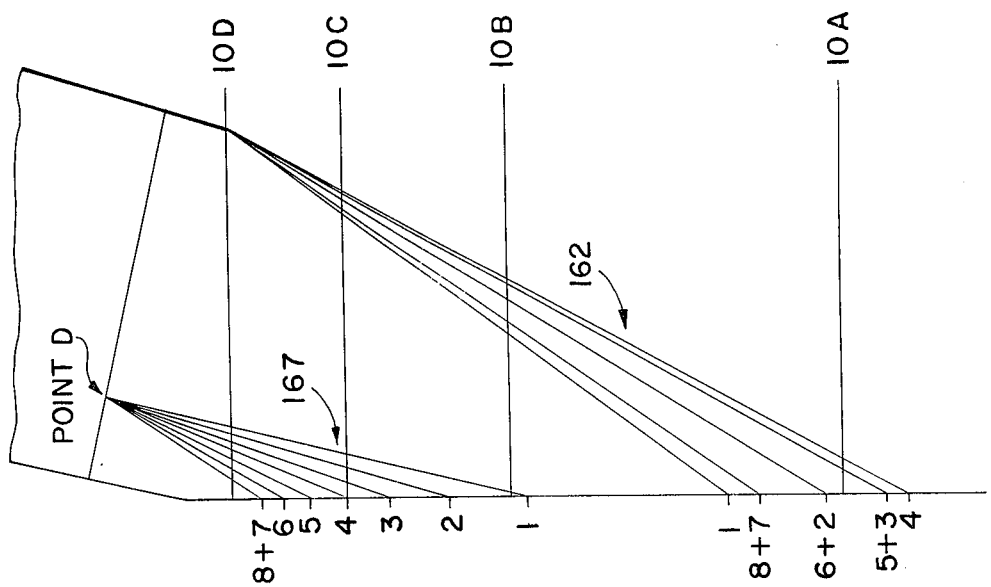
FIG. 9B is a schematic diagram corresponding to the view of FIG. 9 for describing the shape of the intake duct for the second version of the embodiment of FIG. 9.
Figure 9:
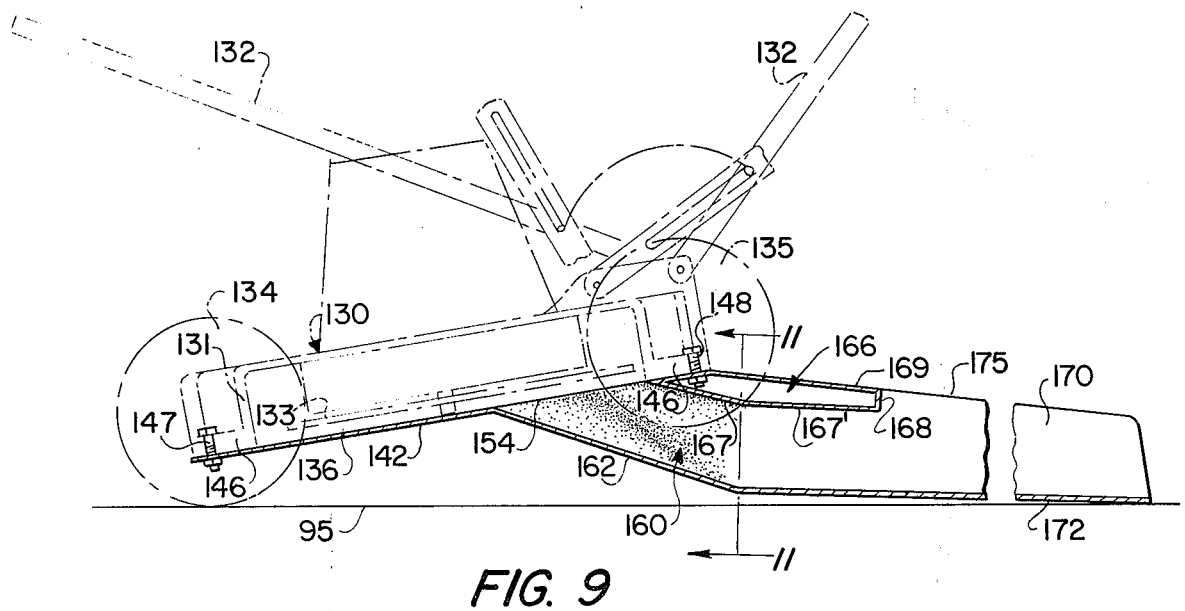
FIG. 9 is a vertical section view on the line 9—9 of FIG. 6 with portions of the rotary mower to which the shredder attachment is attached shown in phantom line.

As seen in FIGS. 6 and 9, a second embodiment of the invention is intended for use with a mower 130 of the type which is not provided with a volute chamber. Thus, the housing 131 of mower 130 forms a chamber 136 within which rotary blade 133 rotates as shown by the arrow in FIG. 6. There being no volute wall, the chamber extends inwardly from housing 131 to the center of the mower. As is usual with such mowers, a pair of front wheels 134 and a pair of rear wheels 135 are provided, and an adjustable handle 132 may be pivoted to a rearward or a frontward position as shown in FIG. 9. Material cut by the blade is, as is customary, driven out through a discharge opening 138 formed by a discharge duct 139 and may be collected in a bag.

In order to convert mower 130 into shredding apparatus, the second embodiment of shredder attachment 140 is employed. This attachment is constructed generally on the principles of the embodiment of FIGS. 1–5, inclusive, and such differences as exist will be noted as this embodiment is described. A flat shredder plate 142 is secured to the bottom 146 of mower housing 131. The plate is flat, and not dished, because the distance between rotary blade 133 and the bottom of the housing is great enough (¾ inch, for example) to provide the proper clearance for the largest object to be fed into the shredder. Plate 142 is secured to the bottom 146 by means of a series of bolts 147 and 148 as shown in FIG. 9.

Shredder plate 142 is provided with a shredder opening 154. It will be noted from FIG. 6 that the shape of opening 154 is somewhat different from the shape of opening 54 of FIG. 2. This is made possible, because there is no necessity to conform the width of opening 154 to the width of an annular volute. Thus, opening 154 has an upstream side 155 which corresponds generally with the center line of the mower and an arcuate portion 156 extending from side 155 in an arc until it intersects with the edge of plate 142 on the downstream side of opening 154. It is to be noted that opening 154 is shaped and located according to the same principles which govern the location of opening 54 of FIG. 2. Thus, opening 154 is located so that it opens to that part of chamber 136 within which rotary blade 133 will move in a direction perpendicular (at edge 155) to the feed path of material to be shredded and thereafter in directions having components both perpendicular to and in the direction of the path of material being fed into chamber 136 through opening 154. This again insures that material struck by blade 133 will be driven and drawn into chamber 136 rather than be driven out of opening 154.

Opening 154 is, again, formed as a portion of an annulus which extends around the center of rotation of blade 133 within chamber 136. It will be observed that the opening 154 extends along approximately one-fifth of the total annulus, but that the radial extent of the opening is substantially larger than one-fifth of the diameter of the mower blade. It is to be noted, moreover, that opening 154 is positioned toward the rear side of mower 130 and is generally on the side of the mower opposite to discharge opening 138.

Figure 10A:
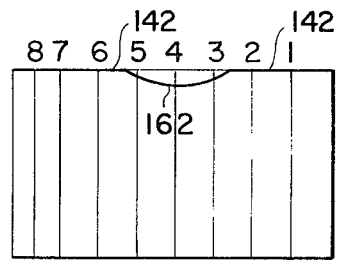
FIGS. 10A, 10B, 10C, and 10D are schematic diagrams showing the cross-sectional shape of the intake duct walls and baffle taken, respectively, along lines 10A, 10B, 10C, and 10D of FIG. 6 for an ideal version of the second embodiment of FIG. 6.
Figure 10B:
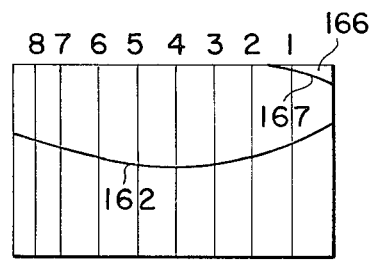
Figure 10C:
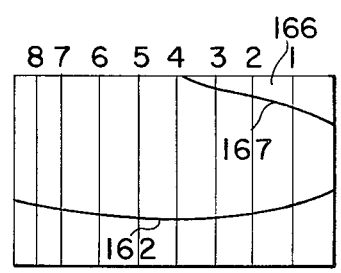
Figure 10D:
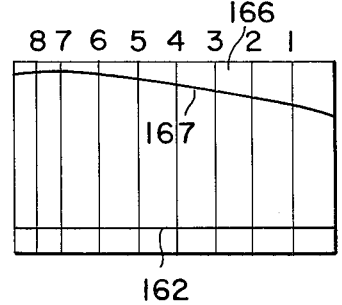
Figure 10:
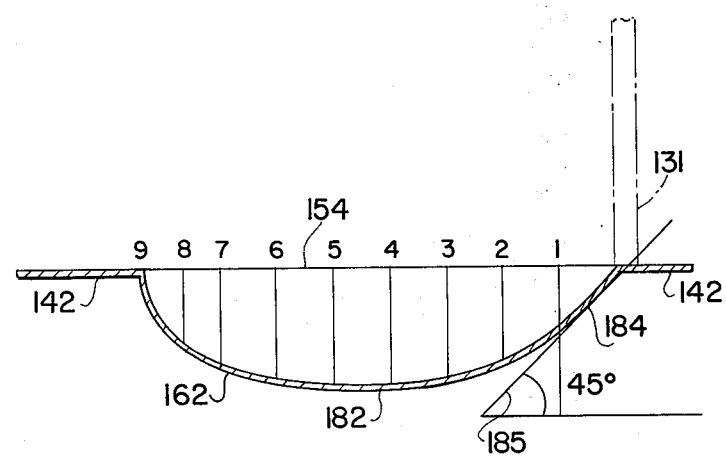
FIG. 10 is a section view along line 10—10 of FIG. 6.

This embodiment also is provided with an intake duct 160 formed by a duct wall 162 which is of a complex curved configuration. The shape of wall 162 will be generally appreciated from FIG. 7 which is a plan view of the duct with the plate and baffle removed and from FIG. 8 which is an end view of the duct along lines 8—8 of FIG. 7 with the plate removed. It will thus be seen that wall 162 is characterized by two curved sides 178 and 179 which meet the plane of plate 142 along edge 156 of opening 154, the curve continuing until section line 8—8 where bottom wall 162 is virtually flat. The shape of wall 162 along section lines 10—10 is shown in FIG. 10 and includes a curved bottom portion 182 and a reentry ramp portion 184 on the downstream side where wall 162 intersects with plate 142. It will be noted from FIG. 10 that reentry ramp portion 184 intersects plate 142 at an included angle of substantially 45 degrees. Thus, again, when air and particles are deflected downwardly by the rotary blade 133, the entry ramp means 184 will serve to deflect the air and particles back into chamber 136 through opening 154.

Figure 11:
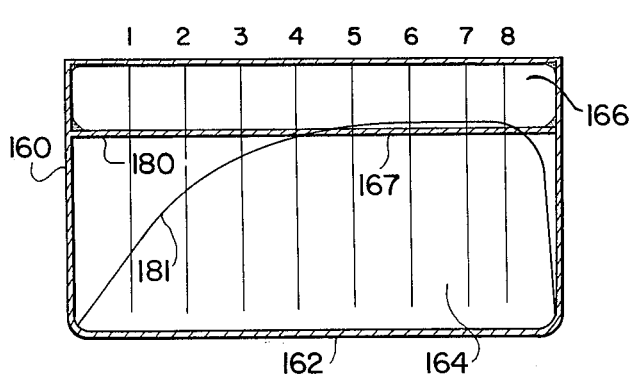
FIG. 11 is a section view along line 11—11 of FIG. 9.

In this embodiment, intake duct 160 is lengthened relative to the length of the intake duct in the embodiment of FIGS. 1–5. This reduces the danger that fingers will be inadvertently placed in the blade chamber 136. Thus, turning to FIG. 9, it will be noted that duct 160 extends to the end of an elongated baffle 166 terminating at wall 168. The shading used in FIG. 9 illustrates the curved surface of wall 162, it being understood that the opposite wall is also curved. Baffle 166 is provided so as to help maintain the cross-sectional area of duct 160 substantially constant and includes a bottom wall 167 which has an extension 167' at a slight angle thereto. Section 167' is connected by an end wall 168 to a top wall 169. As will be apparent from FIG. 11, the ideal shape of the duct for a constant cross-sectional area is defined by line 181 corresponding to baffle 166. However, as was explained hereinabove with respect to the first embodiment, a good approximation is provided by a duct defined at section line 11—11 by the line 180 corresponding to the horizontal lower wall 167 of baffle 166. Thus, the walls of duct 160 are shaped so that, at section line 11—11, the duct is provided with a substantially rectangular opening as shown in FIG. 11.

As noted, two versions of the embodiment of FIGS. 6 and 9 are possible, and these will now be described. The first, or ideal, version attempts to maintain the ideal constant cross-sectional shape of the duct 160 throughout its length. In the second, or practical, version, the approximation defined by line 180 is employed.

For the ideal version, the shape of duct wall 162 and baffle wall 167 are defined by the schematic diagram of FIG. 9A. A number of section lines 1, 2, 3, 4, 5, 6, 7, and 8 are drawn on FIG. 6 to define a like number of parallel planes extending in the direction of the axis of duct 160. Each of these planes intersect walls 162 and/or 167 along the lines designated by corresponding reference number 1, 2, 3, 4, 5, 6, 7, and 8 in FIG. 9A. FIG. 10A shows the curved shape of the wall 162 along section line 10A of FIGS. 6 and 9A; and FIGS. 10B, 10C, and 10D show the shapes of walls 162 and 167 along section lines 10B, 10C, and 10D, respectively, of FIGS. 6 and 9A.

The shape of walls 162 and 167 for the second version of the embodiment of FIGS. 6 and 9, which version provides the practical approximation with a rectangular opening as defined by line 180 at the inlet end of the duct, is defined by the schematic diagram of FIG. 9B. Lines, 1, 2, 3, 4, 5, 6, 7, and 8 define the lines of intersection between section planes 1, 2, 3, 4, 5, 6, 7, and 8 of FIG. 6 and walls 162 and 167. It is to be noted that the lines defining the intersections with wall 167 converge at point D in order to provide the horizontal orientation of wall 167 as defined by line 180. FIG. 10A' shows the shape of wall 162 for the second version along section line 10A of FIGS. 6 and 9B, and the shapes of walls 162 and 167 at section lines 10B, 10C, and 10D are shown, respectively, in FIGS. 10B, 10C, and 10D. The lines of intersection are shown in FIGS. 9A and 9B as straight lines, but it is to be understood that the lines of intersection may be curved for modified shapes of the duct.

Duct 160 is joined to a material receiving apron 170, which extends rearwardly of mower 130. It will be noted that the bottom wall 172 of apron 170 is, in part, the bottom wall of the end section of duct 160 below wall section 167'. As is seen in FIG. 6, apron 170 has side walls 173 and 174, forming a channel-shaped structure, the top side of which is open. Side wall 173 diverges outwardly to encourage the introduction of material on the downstream side of opening 154 as has been previously explained with reference to the embodiment of FIG. 2.

As is best seen in FIG. 9, the second embodiment of the invention is used substantially in the same way as the first embodiment. The duct and apron 170, which extend rearwardly from opening 154, are so positioned that the bottom wall 172 of apron 170 rests on the ground 95 so that material to be shredded may be raked or pushed onto apron 170 from the ground. Although a folding leg is not shown in FIG. 9, it is to be understood that this embodiment of the invention may also be provided with a mechanism of this character for elevating apron 170 when desired. In either case, material to be shredded is loaded either through the open end of material receiving apron 170 or through the open top 175 thereof. Long objects, such as branches and stalks may be fed directly into chamber 136 by hand from the inlet end of duct 160. Because the duct in this embodiment is longer, greater security is provided from the danger of a hand of the operator extending too close to the chamber 136.

A third embodiment of the invention is illustrated in FIGS. 12–18, inclusive. In this embodiment, shredder attachment 240 includes a shredder plate 242, which is again secured to the bottom of the housing 231 of rotary power mower 230 in the same manner as the shredder plates of the first two embodiments of the invention. This closes the bottom side of shredding chamber 236, within which rotor blade 233 rotates. An essentially annular intake opening 254 through plate 242 is positioned under the rear of a mower 230. However, an intake duct 260 extends forwardly of the mower leading to an apron 270 positioned on the front side of the mower. This arrangement permits the combined mower-shredder to be wheeled about on the rear wheels 235 of the mower with a non-reversible mower handle 232 extending rearwardly of the mower, which is, of course, the conventional position of a mower handle. Front wheels 234 of the mower cannot be used for this purpose, because duct 260 and apron 270 raise the front side of mower 230 from the ground. This embodiment also safely permits the use of a somewhat wider duct as shown in FIG. 12, the duct width is somewhat greater than one-half the diameter of chamber 236. This embodiment is quite effective for the shredding of leaves and other small, light material which can be borne into the chamber by air flow. However, it is unsuitable for chopping branches or stalks, because of the change of direction and resultant bending required of the material in order for it to enter shredding chamber 236 from apron 270.

Intake duct 260 communicates with chamber 236 through opening 254 and includes a complex curved bottom wall 262, the shape of which will be presently described. The duct extends beneath plate 242 in a direction forwardly of the mower and joins material receiving apron 270 where the duct passes under the front side of the mower. Apron 270 includes a bottom wall 272 a pair of side walls 273 and 274, the left hand wall 273 being diverged outwardly. The top side of apron 270 is open as shown at 275.

A number of section lines 13, 14, 15, 16, 17, and 18 illustrate the shape of intake duct 260, and a number of contour lines A, B, and C further illustrate the shape of duct wall 262. At the intake end of intake duct 260 as shown in FIG. 13, the duct is essentially rectangular. At a point directly below the center of the mower along line 14, the sides of wall 262 begin to curve upwardly. At a point just below the beginning of intake opening 254 as shown along line 15 a more complex shape is effected showing the effect of the annular opening. At lines 16, 17, and 18, as illustrated in FIGS. 16, 17, and 18, the shape of wall 262 continues a transition until it achieves an arcuate form along line 18. This arcuate form will continue up contours C, B, and A until the wall 262 joins plate 242 along the rear edge of opening 254. It is to be noted that an essentially constant cross-sectional area is maintained throughout the length of duct 260, but a generally rectangular cross-section is provided along the intake end of duct 260 at section line 13.

A reentry ramp 284 is provided at the downstream side of intake opening 254 with respect to the direction of rotation of blade 233. The shape of reentry ramp 284 is illustrated by contour lines A, B, and C and again serves to deflect material deflected downwardly by the blade through opening 254 back through opening 254 into chamber 236. It is to be noted, moreover, that the portion of wall 262 forming reentry ramp 284 is positioned out of alignment with the main passageway of duct 260. Thus, even through the upper portion of opening 254 (as seen in FIG. 12) extends beyond the center line of mower 230, the motion of blade 233 will not have any significant component of motion in the direction of the duct passageway as it moves over opening 254. This will tend to prevent the likelihood that material to be shredded will be introduced into chamber 236 at a point where it may be driven by the blade out through the inlet end of duct 260.

It is to be noted that the shape of opening 254 may be modified by extending the front edge of opening 254 to the dash line 255. It is important, however, that the right hand portion of the front side near reentry ramp 284 should not be moved significantly forwardly of the mower to avoid the possibility of objects being inserted into the blade chamber in an area where the blade is advancing back toward the inlet of the intake duct.

In using the embodiment of FIG. 12, apron 270 is rested on the ground, and material to be shredded is raked onto apron 270 and pushed or drawn by suction through duct 260 into chamber 236. After being introduced into chamber 236, the material will be shredded by rotating blade 233 and driven out discharge opening 238 formed by discharge duct 239 of mower housing 231. As before, a bag may be attached to duct 239 to catch the shredded material. When it is desired to move the mower-shredder to a new location, the apron 270 is tipped upwardly and the apparatus is wheeled on rear wheels 235 to the new location.

Shredder attachments according to the present invention are useable with many types of rotary power mowers. As is known, rotary lawn mowers are made in a few specific rotor blade diameter sizes, such as eighteen inches, twenty inches, twenty-two inches, twenty-four inches, and twenty-five inches. The first three mentioned sizes are generally of the walk-behind type, either self-propelled or not, while the last two mentioned sizes are generally of the riding mower type. All can be fitted with a shredder attachment of the present invention. While a shredder attachment could probably be designed to fit most any mower of one of these sizes, providing clearance for variation in the position and size of wheels and discharge chutes, this would result in a somewhat clumsy design and the need for a universal means for attaching the shredder attachment to mowers of various types. Consequently, it is more practical to design a special shredder attachment to fit each specific mower type.

It is often desirable to reduce the angle between the intake duct and plate and make the duct more nearly parallel to the plane of the plate. When this is done, the top and bottom walls of the baffle become so nearly coincident that it becomes practical to eliminate the bottom wall of the baffle, leaving a portion of the end wall of the baffle as a stiffening flange depending from the edge of the remaining top wall of the baffle. Thus, in the embodiment of FIG. 3, when duct 60 is made more nearly parallel to plate 42, wall 67 of duct 60 may be eliminated, and the top portion of end wall 68 may be retained as the stiffening flange. By the same token, in the embodiment of FIG. 9, when the angle between duct 160 and plate 142 is reduced, wall 167–167' may be removed and a portion of wall 168 may be retained as the stiffening flange. These modifications of the embodiments of FIGS. 3 and 9 result in a small, but insignificant, violation of the constant duct cross section requirement. On the other hand, these modifications markedly simplify the construction of the attachments.

While preferred embodiments of the invention have been shown and described, it is to be understood that modifications may be made within the spirit of the invention, the scope of the invention being defined in the appended claims.

That which is claimed is:

1. A shredder attachment for a rotary mower, having a housing defining a chamber with an open bottom side and a side wall, a discharge opening through said side wall, and a rotary blade adapted to rotate within said chamber, comprising:
   a plate for covering said open bottom side of said chamber, said plate having an intake opening;
   an intake duct extending from said plate between said intake opening and a duct inlet end; and
   an apron for receiving material to be shredded, said intake duct being connected between said apron and said plate and communicating with said apron at its inlet end and with said intake opening at said plate to guide material to be shredded along a path from said apron through said intake opening into said chamber, said intake opening and duct being so shaped and positioned that said rotary blade will be inhibited from driving material fed into said chamber back towards the inlet end of said duct.

2. A shredder attachment according to claim 1, wherein said apron, intake duct, and intake opening are aligned to permit long objects to be inserted into said chamber.

3. A shredder attachment according to claim 1, wherein said duct includes baffle means at the top of said duct shaped to maintain the cross-section of said duct substantially constant.

4. A shredder attachment according to claim 1, wherein said duct includes reentry ramp means at the downstream side of said intake opening with respect to the direction of rotation of said rotary blade for deflecting air and particles deflected tangentially from said blade back into said chamber.

5. A shredder attachment according to claim 4, wherein said reentry ramp means comprises a curved wall of said duct extending substantially at an angle of 45° with respect to said plate.

6. A shredder attachment according to claim 1, wherein said rotary blade, when it passes over said intake opening, has components of motion perpendicular to said path and in the direction of said path.

7. A shredder attachment according to claim 6, wherein said intake opening is wholly on the downstream side of the longitudinal axis of said chamber relative to the direction of rotation of said blade.

8. A shredder attachment according to claim 1, wherein said apron comprises a channel shaped section aligned with said duct, the top side of said section being open.

9. A shredder attachment according to claim 8, wherein the upstream side of said apron with respect to the direction of rotation of said rotary blade diverges outwardly.

10. A shredder attachment according to claim 1 wherein said intake opening is in the form of a portion of an annulus.

11. A shredder attachment according to claim 10, wherein said intake opening is on the opposite side of said chamber from said discharge opening.

12. A shredder attachment according to claim 10, wherein said intake opening occuppies substantially one-fifth of said annulus.

13. A shredder attachment according to claim 10, wherein said intake opening has a width approximately one-fifth the diameter of the blade.

14. A shredder attachment according to claim 10, wherein said mower has an interior circular partition forming an annular volute and wherein the width of said intake opening is substantially equal to the width of said volute.

15. A shredder attachment according to claim 1, wherein said intake opening is at the rear side of said mower and said duct extends rearwardly of said mower.

16. A shredder attachment according to claim 1, wherein said intake opening is at the rear side of said mower and said duct extends forwardly of said mower from said intake opening.

17. A shredder attachment according to claim 1, further comprising folding leg means for propping said mower with said apron in an elevated position.

18. A shredder attachment according to claim 1, wherein said plate is flat.

19. A shredder attachment according to claim 1, wherein said plate is dished to provide clearance beneath said blade for objects to be shredded.

20. A shredder attachment according to claim 1, wherein said inlet end of said duct is rectangular in cross-section.

21. A shredder attachment according to claim 1, wherein at least one wall of said duct is curved and said duct includes baffle means to maintain a constant cross-section in said duct.

22. A shredder attachment according to claim 1, wherein said mower has a pair of front wheels and a pair of back wheels, and wherein said duct and apron tilt one of said pairs of wheels off the ground, the other pair of wheels remaining on the ground so that said mower with the attachment secured thereto may be wheeled to a new position on said other pair of wheels.

* * * * *